United States Patent Office 3,275,659
Patented Sept. 27, 1966

3,275,659
TRIORGANOTIN OXIMES AND THEIR PREPARATION
Gustav Weissenberger, Zurich, Switzerland, assignor to Monsanto Company, a corporation of Delaware
No Drawing. Filed Apr. 9, 1962, Ser. No. 185,797
Claims priority, application Switzerland, Apr. 28, 1961, 5,058/61
13 Claims. (Cl. 260—347.7)

The present invention relates to triorganotin oximes and the preparation thereof. These triorganotin oximes have the general formula

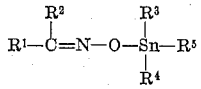

and are useful as active ingredient in pest-controlling agents.

In the formula set forth, $R^1$, $R^2$, $R^3$, $R^4$ and $R^5$ are identical or different aliphatic, cycloaliphatic, araliphatic, aromatic or heterocyclic radicals which may be unsaturated and bear optimal substituents. The radicals $R^1$ and $R^2$, moreover, may also be hydrogen atoms or, taken together, a cycloaliphatic or heterocyclic ring. Although the R groups, i.e., $R^1$, $R^2$, etc., can have any number of carbon atoms, preferred compounds have not more than 18 carbon atoms per R group, especially alkyl groups having not more than 6 carbon atoms.

The term "triorganotin" used in this description signifies a tin atom which contains three organic radicals, each being linked through a carbon atom with the tin atom.

A process for preparing organotin derivatives of oximes by transesterification of organotin alkoxides is well known (U.S. Patent 2,727,917, Aug. 5, 1950, Advance Solvents and Chemical Corporation, New York). Now a simpler process has been found giving better yields, which process is based on the reaction of a bis-(triorganotin)-oxide or a triorganotin hydroxide with an oxime. This reaction occurs according to the following scheme:

$$2R_2C=N-OH + (R_3Sn)_2O \rightarrow 2R_2C=N-OSnR_3 + H_2O$$

or $$R_2C=N-OH + R_3SnOH \rightarrow R_2C=N-OSnR_3 + H_2O$$

Another method resides in the reaction of a triorganotin salt with a salt of an oxime. Triorganotin chlorides and alkali salts of oximes are preferably employed:

$$R_2C=N-ONa + R_3SnCl \rightarrow R_2C=N-OSnR_3 + NaCl$$

Optional trialkyl, tricycloalkyl, triaralkyl, triaryl or triheterocycloalkyl oxides, or hydroxides, or chlorides respectively, in both methods are suitable. All or part of these radicals may be unsaturated radicals such as, for example, vinyl, allyl, cyclopentenyl, cyclohexenyl, cyclohexadienyl, styryl, etc. All occurring aldoximes or ketoximes can be used as second reaction partners. These may contain optional substituents such as halogen, amino, cyano, nitro, carboxyl, carboxylate, hydroxyl, thio groups, etc. It is understood that the stoichiometric ratio of the reactants must correspondingly be adapted when substituents are present such as, e.g., hydroxyl, thio, carboxyl groups, etc., which also may react with the triorganotin oxides, or hydroxides respectively, or in the form of alkali salts with triorganotin chlorides.

It is clear, that di-, tri-oximes, etc. can be reacted in exactly the same manner. Therefore, in the formula given hereinabove the radicals $R^1$ and $R^2$ may also contain $R_3SnON=$ groups. The hydroxylic hydrogen atom may be replaced by a triorganotin radical in either all, or only part of the oxime groups present. Thus, $R^1$ and $R^2$ can be joined and form together with the C atom to which they are attached cycloaliphatic or heterocyclic rings, which may possess a group $=N-O-SnR^3R^4R^5$ as substituent, e.g.,

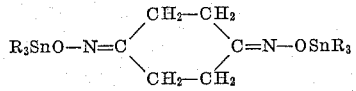

Such compounds are derived from cycloalkanedione dioximes; $R^1$ can be a group

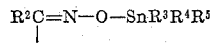

e.g.,

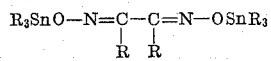

Such compounds are derived from, for example, glyoxal dioxime, diacetyl dioxime, benzil dioxime (=alpha-dialdehydes or -ketones); $R^1$ can also be a group $$-R^6-C=N-O-SnR^3R^4R^5$$

where $R^6$ is a bivalent hydrocarbon radical, e.g.,

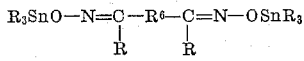

Such compounds are derived from, for example, acetylacetone dioxime, succinaldehyde dioxime (=beta-, or gamma-, etc., dialdehydes or -ketones).

It should be noted that the triorganotin oxime ethers which possess two different radicals, or a radical and a hydrogen atom, on an oxime C-atom are mixtures of stereoisomeric forms.

It has been found, that on reacting the tri-sodium salt of trimeric formaldoxime with the necessary amount of a triorganotin chloride, nevertheless the normal monomeric derivative is obtained.

To put into practice the generally preferred method, a bis-(triorganotin)-oxide or a triorganotin hydroxide and an oxime are heated together, and the water which is formed in the reaction is continuously removed from the reaction mixture by evaporation, possibly under reduced pressure, or in an azeotrope with a solvent such as e.g., benzene, toluene, xylene, cyclohexane, etc. However, water-binding agents such as CaO, Linde's molecular sieves, etc., may also be used instead to remove the water.

In the second method, a triorganotin halide is heated, preferably in a solvent, with an alkali salt of an oxime, or with an oxime in the presence of an acid-fixing or acid-binding agent.

Alkali carbonates, alkali hydroxides, tertiary organic bases, etc., are suitable acid-binding agents. A modification of this process resides in saturating with ammonia gas a solution of the triorganotin chloride in a solvent such as, e.g., toluene and heating the mixture after the oxime has been added. Thereby ammonium chloride precipitates. The isolation of many triorganotin oximes may be effected by distillation. The salts such as NaCl, KCl, $NH_4Cl$, etc., which are formed as by-products in the second method, do not necessarily have to be removed in the preparation of pest-controlling agents. Depending on the kind of triorganotin compounds and oximes used in the reaction, the colorless reaction products are liquid or solid. They are for the most part soluble in common solvents.

It has been found that the triorganotin oximes are new means for combatting plant sicknesses and noxious animals. In particular, they display an excellent fungicidal and bactericidal activity. Thus, the growth of, for example, *Aspergillus niger*, *Staphylococcus aureus*, etc., on agar is completely inhibited by O-tributyltinacetone-oxime, O,O'-tributyltin-dimethylglyoxime, O-tributyltin-benzophenone-oxime, etc., in a concentration of, e.g., 1:1,000,000. The triorganotin oximes may be used alone or in combination with other similar active ingredients.

If these triorganotin oximes are added to soaps, cleaning compositions, etc., the soaps, etc., have excellent disinfectant power. They are also useful as both pre- and post-emergent herbicides.

Example 1

6.8 g. (0.094 mole) of acetone-oxime and 28 g. (0.047 mole) of tributyltin oxide in 125 ml. of toluene are refluxed and the water formed in the reaction is azeotropically distilled off. A water-separator according to Dean-Stark is used. The condensation is complete within about ½ to 1 hour. The amount of water separated corresponds to the theory. After elimination of the toluene, it remains a water-clear liquid.

Yield 86%; B.P. 83–85° C./0.005 mm.; $n_D^{20}$ 1.4768.
Analysis.—$C_{15}H_{33}ONSn$:

| Percent | Calc'd | Found |
|---|---|---|
| C | 49.75 | 49.82 |
| H | 9.19 | 9.11 |
| Sn | 32.8 | 32.1 |

Example 2

5.0 g. (0.025 mole) of benzophenone-oxime and 7.57 g. (0.0127 mole) of tributyltin oxide in 40 ml. of toluene are refluxed and the water formed in the reaction is azeotropically distilled off. A water-separator according to Dean-Stark is used. The condensation is complete within about ½ to 1 hour. The amount of water separated corresponds to the theory. After elimination of the toluene, a water-clear liquid remains.

Yield 88–95%; B.P. 215° C./0.25 mm.; $n_D^{20}$ 1.5553.
Analysis.—$C_{25}H_{37}ONSn$:

| Percent | Calc'd | Found |
|---|---|---|
| C | 61.57 | 61.60 |
| H | 7.67 | 7.53 |
| Sn | 24.4 | 24.1 |

Example 3

8 g. (0.01 mole) of bis-(trihexyltin)-oxide $$(C_6H_{13})_3SnOSn(C_6H_{13})_3$$

and 1.5 g. (0.021 mole) of acetone-oxime in 30 ml. of benzene are refluxed for 1 hour. A water-separator according to Dean-Stark is used. After the benzene and the water formed in the reaction are distilled off, a yellow oil remains.

Yield 90.5%; B.P. 118° C./0.005 mm.; $n_D^{20}$ 1.4750.
Analysis.—$C_{21}H_{45}NOSn$:

| Percent | Calc'd | Found |
|---|---|---|
| C | 56.5 | 56.59 |
| H | 10.09 | 10.26 |
| Sn | 26.6 | 25.6 |

Example 4

25 g. (0.016 mole) of the sodium salt of trioxymidomethylene (trimeric formaloxime) and 16.26 g. (0.05 mole) of tributyltin chloride in 30–50 ml. of methanol are refluxed for ½ hour. The salt which separates is filtered off and the methanol removed in vacuum. The main part of the residue boils at 75–76° C./0.006 mm.; $n_D^{20}$=1.4837. The determination of molecular weight shows that the compound is monomeric.

Analysis.—$C_{13}H_{29}ONSn$:

| Percent | Calc'd | Found |
|---|---|---|
| C | 46.8 | 46.7 |
| H | 8.7 | 9.16 |
| Sn | 35.6 | 35.7 |

Example 5

6.5 g. (0.058 mole) of furfural-oxime and 17.3 g. (0.029 mole) of tributyltin oxide in 80 ml. of benzene are refluxed for 2 hours. A water-separator is used. The amount of water formed corresponds to the theory. After removal of the benzene the residue is distilled.

Yield 83.6% colorless liquid; B.P. 113–115° C./0.001 mm.; $n_D^{20}$ 1.5181.
Analysis.—$C_{17}H_{31}O_2NSn$:

| Percent | Calc'd | Found |
|---|---|---|
| Sn | 29.7 | 29.1 |

Example 6

8 g. (0.01 mole) of bis-(trihexyltin)-oxide $$(n{=}C_6H_{13})_3SnOSn(C_6H_{13}{=}n)_3$$

and 4.14 g. (0.02 mole) of benzophenone-oxime in 50 ml. of benzene are refluxed for 1 hour. The water formed in the reaction is azeotropically removed. The solution is filtered and the benzene distilled off. A yellow oil remains.

Yield 96%; B.P. 192–193° C./0.01 mm.; $n_D^{20}$ 1.5388.
Analysis.—$C_{30}H_{49}NOSn$:

| Percent | Calc'd | Found |
|---|---|---|
| C | 64.5 | 65.33 |
| H | 8.78 | 8.83 |
| Sn | 33.0 | 31.3 |

Example 7

23 g. (0.039 mole) of bis-(tributyltin)-oxide $$(n{=}C_4H_9)_3SnOSn(C_4H_9{=}n)_3$$

and 5.5 g. (0.039 mole) of 1,4-cyclohexanedione-dioxime in 100 ml. of benzene are refluxed for 2 hours. The water formed in the reaction is azeotropically removed. The solution is filtered and the benzene distilled off. A yellow oil remains.

Yield 95% (crude product); not dist. dec.; $n_D^{20}$ 1.5065.
Analysis.—$C_{30}H_{62}O_2N_2Sn_2$:

| Percent | Calc'd | Found |
|---|---|---|
| C | 50.1 | 51.47 |
| H | 8.62 | 8.83 |
| Sn | 33.0 | 31.3 |

Example 8

7.5 g. (0.006 mole) of bis-(tridodecyltin)-oxide and 0.88 g. (0.012 mole) of acetone-oxime in 25 ml. of benzene are refluxed for 1 hour. The water formed in the reaction is azeotropically removed. The solution is filtered and the benzene distilled off. There remains a white wax.

Yield 92% (crude product); M.P. 45–49° C.

Example 9

7.5 g. (0.006 mole) of bis-(tridodecyltin)-oxide and 2.36 g. (0.012 mole) of benzophenone-oxime in 40 ml. of benzene are refluxed for 1 hour. The water formed in the reaction is azeotropically removed. The solution is filtered and the benzene distilled off. There remains a white wax.

Yield 98% (crude product); M.P. 133–137° C.

*Example 10*

29.8 g. (0.05 mole) of bis-(tributyltin)-oxide and 12.0 g. (0.05 mole) of diphenylglyoxime in 150 ml. of toluene are refluxed for 2 hours. The water formed in the reaction is azeotropically removed. The solution is filtered and the toluene distilled off. The theoretical amount of water (0.9 mole) separates in the water-trap. There remains a liquid which becomes turbid on standing.

Yield: 100% (crude product); $n_D^{20}$ 1.5382.

Analysis.—$C_{38}H_{64}N_2O_2Sn_2$:

| Percent | Calc'd | Found |
|---------|--------|-------|
| C       | 55.77  | 55.37 |
| H       | 7.88   | 7.99  |
| Sn      | 29.0   | 28.7  |

*Example 11*

29.8 g. (0.05 mole) of bis-(tributyltin)-oxide and 5.8 g. (0.05 mole) of dimethylglyoxime in 150 ml. of toluene are refluxed for 2 hours. The water formed in the reaction is azeotropically removed. The theoretical amount of water (0.9 mole) separates in the water-trap. The solution is filtered and the toluene distilled off. There remains a yellow oil.

Yield: 100% (crude product); $n_D^{20}$ 1.5050.

Analysis.—$C_{28}H_{60}N_2O_2Sn_2$:

| Percent | Calc'd | Found |
|---------|--------|-------|
| C       | 48.44  | 48.5  |
| H       | 8.71   | 8.6   |
| Sn      | 34.2   | 33.0  |

*Example 12*

For evaluation of the bacteriostatic and fungistatic effects of these new compounds, a number of these compounds were tested. These compounds were mixed in predetermined concentrations with hot sterile agar which was subsequently poured into Petri dishes, cooled, and allowed to harden. Nutrient agar containing the test compounds was then inoculated with the bacteria *Staphylococcus aureus* and incubated for two days at 37° C.; and Sabouraud's dextrose agar containing the test compounds was inoculated with the fungus organism *Aspergillus niger*, and incubated for five days at 27° C. The products of Examples 1, 2, 4, 5 and 11 all inhibited the growth of both the bacteria and the fungus at concentrations of the test chemical as low as one part per million.

Usually these novel organotin compounds will be applied as bacteriostats or fungistats at concentrations in the range of 0.0001% to 1.0%, preferably 0.001% to 0.1%, suspended, dispersed or dissolved in inert carriers. The new compounds of this invention may be applied directly to microorganisms (bacteria and fungi), the growth of which it is wished to inhibit, or they may be compounded in emulsions or in other forms for application in a similar manner as described for compounding the organotin compounds as herbicides hereinbelow.

*Example 13*

This test method covers procedures for determining the bacteriostatic and fungistatic activity imparted to cloth by the compounds of the invention in detergents. The method consists essentially of washing cloth in a detergent containing a test compound then determining if the compound has imparted any bacteriostatic or fungistatic activity to the cloth.

The cloth, for example cotton cloth, to be tested is washed in a Terg-O-Tometer for ten minutes followed by two, 2-minute rinses. The cloth is passed through a wringer after the wash cycle and after the final rinse, then dried by spreading on absorbent paper. The cloth to water ratio is 1:20, normally 40 grams to 800 ml. The test detergent is used at a 0.25% concentration, based on the weight of water. The test compound is expressed as percent of the detergent. The temperature of the wash and rinse cycles is 120° F., and the agitator is adjusted to 100 r.p.m.

The treated cloth is cut to the desired sizes and shapes, placed in clean Petri dishes and sterilized 5 minutes at 121° C., 15 pounds pressure. The autoclave is rapidly exhausted after the sterilization and the cloth removed from the heat.

In the bacteriostatic test sterile 3-inch by 3-inch cloth swatches are inoculated with 2 ml. of the appropriate broth which has been inoculated with bacteria. The swatches are incubated for 24 hours, then an indicator is added to show a pH change if growth has occured. The test bacteria used was *Staphylococcus aureus* and the dextrose broth contained the bacteria at a concentration of approximately $1.0 \times 10^1$ organisms per ml.

In the fungistatic test sterile 3 inch by 3 inch cloth swatches are inoculated with $2.0 \times 10^4$ *Aspergillus niger* spores in 2 ml. of Sabouraud's dextrose broth. The swatches are then incubated in a closed incubator (to maintain a high humidity) at 28° C., and examined periodically for first signs of growth and growth at the end of definite time periods is determined.

Not only were the test compounds tested in the presence of detergents for bacteriostatic and fungistatic activity but also in the presence of detergents plus "Clorox" bleach agent. The data from these tests is reported in Table 1.

TABLE 1

| Compound | *Staphylococcus aureus*, Wt. Percent Compound in Detergent | | *Aspergillus niger*, Wt. Percent Compound in Detergent | | | |
|----------|--------------------|----------|---------------|--------------|---------------|--------------|
|          | No "Clorox"        | "Clorox" | 4 Days No "Clorox" | 4 Days "Clorox" | 7 Days No "Clorox" | 7 Days "Clorox" |
| The Product of: | | | | | | |
| Example 1  | 0.75 | 0.75 | 0.25 | 0.50 | 0.50 | 0.50 |
| Example 2  | (¹)  |      | 1.00 |      | 1.00 |      |
| Example 4  | 0.5  | 0.75 | 0.25 | 0.25 | 0.25 | 0.25 |
| Example 5  | 0.75 | 0.75 | 0.25 | 0.25 | 0.25 | 0.25 |
| Example 11 | 1.00 |      | 1.00 |      | 1.00 |      |

¹ Ineffective at 1.0% by weight of compound in detergent.

The data reported in Table 1 indicate the lowest percent of the novel organotin compounds of the invention in the detergent which is effective to inhibit the growth of the bacteria and the fungus with some execeptions. In instances where the percent reported is 0.25%, the compound may be effective at lower percentages than this. In the testing of Examples 2 and 11, where 1% is reported this does not represent the lowest effective concentration of the organotin compound and further testing would have to be carried out to determined the lowest effective concentration.

Example 14

In this example the pre-emergent herbicidal ratings of some of the organotin compounds of this invention were determined in greenhouse tests in which a specific number of seeds of 3 different plants, each representing a principal botanical type, were planted in greenhouse flats. A good grade of top soil was placed in either 9½" x 5¾" x 2¾" or 9" x 13" x 2" aluminum pans and compacted to a depth of ⅜ inch from the top of the pan. On top of the soil were placed five seeds of each of radish, morning glory, and tomato; 10 seeds of each of sugar beet, sorghum, and brome grass; 20 seeds of each of wild buckwheat, giant foxtail, rye grass, wild oat; approximately 20 to 30 (a volume measure) of each of pigweed and crab grass; and either 2 or 3 seeds of soybean. The seeds were arranged with three soybean seeds across the center of the large aluminum pan, the monocotyledon or grass seeds scattered randowly over the remaining one-third of the soil surface, and the dicotyledon or broadleaf seeds scattered randomly over the remaining one-third of the soil surface at the other end of the pan. The seeds were then covered with ⅜ inch of prepared soil mixture and the pan leveled. The herbicidal composition was applied to the plantings prior to the watering of the seeds. This application of the herbicidal composition was made by spraying the surface of the soil with an acetone solution containing a sufficient quantity of the candidate chemical to obtain the desired rate per acre on the soil surface. The watering of the seeds was accomplished by placing the aluminum pans in a sand bench having one-half inch depth of water thereon and permitting the soil in the pans to absorb moisture through the perforated bottom of the pans.

The planted pans were thereafter placed on a wet sand bench in a greenhouse and maintained there for 14 days under ordinary conditions of sunlight and watering. At the end of this time, the plants were observed and the results recorded by counting the number of plants of each species which germinated and grew. The herbicidal rating was obtained by means of a fixed scale based on the average percent germination of each seed lot. The herbicidal ratings are defined as follows:

No phytotoxicity _____ 0
Slight phytotoxicity _____ 1
Moderate phytotoxicity _____ 2
Severe phytotoxicity _____ 3

The pre-emergent herbicidal activity of some of the organotin compounds of this invention are recorded in Table 2 for various application rates of the organotin compounds. In Table 2, the various seeds are represented by letters as follows:

Morning glory _____ A
Wild oats _____ B
Brome grass _____ C
Rye grass _____ D
Radish _____ E
Sugar beet _____ F
Foxtail _____ G
Crab grass _____ H
Pigweed _____ I
Soybean _____ J
Wild buckwheat _____ K
Tomato _____ L
Sorghum _____ M

TABLE 2.—PRE-EMERGENT HERBICIDAL RATING

| Compound of Example No. | Rate, Lbs./Acre | A | B | C | D | E | F | G | H | I | J | K | L | M |
|---|---|---|---|---|---|---|---|---|---|---|---|---|---|---|
| 1 | 5 | 0 | 2 | 3 | 2 | 3 | 3 | 3 | 2 | 3 | 0 | 2 | 3 | 2 |
| 2 | 5 | 0 | 1 | 0 | 0 | 3 | 1 | 3 | 3 | 3 | 0 | 2 | 3 | 1 |
| 3 | 25 | 0 | 0 | 0 | 1 | 3 | 3 | 3 | 0 | 3 | 0 | 0 | 3 | 0 |
| 4 | 25 | 3 | 2 | 3 | 3 | 3 | 3 | 3 | 3 | 3 | 2 | 3 | 3 | 3 |
|  | ¹5 | 0 | 1 | 3 | 3 | 3 | 2 | 3 | 3 | 3 | 2 | 3 | 3 | 2 |
| 5 | 25 | 3 | 3 | 3 | 3 | 3 | 3 | 3 | 3 | 3 | 3 | 3 | 3 | 3 |
|  | ¹5 | 0 | 0 | 3 | 3 | 3 | 3 | 3 | 3 | 3 | 1 | 3 | 3 | 2 |
| 6 | 25 | 0 | 0 | 0 | 0 | 1 | 2 | 2 | 2 | 3 | 0 | 0 | 3 | 0 |
| 11 | 5 | 0 | 2 | 2 | 1 | 3 | 3 | 3 | 3 | 3 | 0 | 2 | 3 | 2 |

¹ Soil incorporation rather than surface treatment.

Key:
0=Zero to 24% Inhibition of Growth.
1=25 to 49% Inhibition of Growth.
2=50 to 74% Inhibition of Growth.
3=75 to 100% Inhibition of Growth.

The data in Table 2 illustrates the general herbicidal activity as well as the selective herbicidal activity of some of the organotin compounds of the invention. Thus these organotin compounds are particularly useful in soil sterilization applications. For many chemicals soil incorporation at 5 pounds per acre gives essentially the same activity as 25 pounds per acre on the surface.

Example 15

In this example, the contact herbicidal activity of some of the organotin compounds of this invention was determined in greenhouse tests. The organotin compounds to be tested was applied in spray form to 14- or 21-day old specimens of the same grasses and broadleaf plants as used in the pre-emergent tests described in Example 14. The same number of seeds of the same plants used in Example 14 were planted in the 9½" x 5¾" x 2¾" aluminum pans arranged in the same manner with a soybean seed in diagonal corners as described in Example 14. After the plants were 14 or 21 days old, each aluminum pan was sprayed with 6 ml. of a 0.5% or less concentration solution of the candidate chemical, corresponding to a rate of approximately 9 lbs. per acre. This herbicidal solution was prepared from 1.5 ml. of a 2% solution of the candidate compound in acetone, 0.2 ml. of a 3:1 cyclohexanone-emulsifying agent mix, and sufficient water to make a volume of 6 ml. The emulsifying agent was a mixture comprising 35 wt. percent butylamine dodecylbenzene sulfonate and 65 wt. percent of a tall oil-ethylene oxide condensate having about 6 moles of ethylene oxide per mole of tall oil. The injuries to the plants were then observed 14 days later and are reported in Table 3.

TABLE 3.—POST-EMERGENT HERBICIDAL RATINGS [1]

| Compound of Example No. | Concentration Wt. Percent | A | B | C | D | E | F | G | H | I | J | K | L | M |
|---|---|---|---|---|---|---|---|---|---|---|---|---|---|---|
| 1 | 0.5 | 2 | 0 | 0 | 1 | 4 | 4 | 1 | 2 | 4 | 4 | 4 | 4 | 1 |
|   | [3] 0.2 | 1 | 0 | 0 | 0 | 4 | 3 | 0 | 0 | 4 | 3 | 3 | 3 | 0 |
|   | [2] 0.05 | 0 | 0 | 0 | 0 | 3 | 1 | 0 | 0 | 4 | 2 | 2 | 4 | 0 |
| 2 | 0.2 | 2 | 0 | 1 | 1 | 4 | 3 | 1 | 1 | 4 | 4 | 4 | 4 | 2 |
| 3 | 0.5 | 1 | 0 | 0 | 1 | 4 | 4 | 1 | 1 | 4 | 0 | 4 | 3 | 2 |
| 4 | 0.5 | 3 | 4 | 4 | 3 | 4 | 4 | 3 | 0 | 4 | 2 | 4 | 4 | 3 |
|   | 0.05 | 0 | 0 | 0 | 0 | 4 | 2 | 1 | 0 | 4 | 1 | 1 | 2 | 1 |
| 5 | 0.5 | 1 | 2 | 4 | 3 | 4 | 4 | 4 | 3 | 4 | 2 | 4 | 4 | 3 |
|   | 0.05 |   |   |   |   | 4 |   |   |   |   |   |   |   |   |
| 6 | 0.5 | 1 | 0 | 0 | 2 | 4 | 3 | 1 | 0 | 4 | 0 | 4 | 3 | 2 |
| 11 | 0.2 | 3 | 0 | 2 | 1 | 4 | 3 | 1 | 1 | 4 | 3 | 4 | 4 | 2 |
|   | 0.05 | 0 | 0 | 0 | 0 | 4 | 0 | 0 | 0 | 4 | 2 | 0 | 1 | 3 |

[1] In the tests of the compounds of Examples 1, 2 and 7, the plants were 3 weeks old when treated; whereas, in the tests of the compounds of Examples 3–6, inclusive, the plants were 2 weeks old.
[2] = 50 to 75% Defoliation.
[3] = 75 to 100% Defoliation.

Key:

0 = Zero to 24% Inhibition of Growth.
1 = 25 to 49% Inhibition of Growth.
2 = 50 to 74% Inhibition of Growth.
3 = 75 to 99% Inhibition of Growth.
4 = Complete kill.

The herbicidal compositions of this invention are either particulate solid (i.e., dusts) or liquid concentrate compositions comprising the active ingredient and either a particulate solid or liquid herbicidal adjuvant which are formulation aids or conditioning agents permitting the concentrate composition to be readily mixed with a suitable solid or liquid carrier in the field for application of the active ingredient on soil or plant surfaces in a toxic concentration in a form which enables prompt assimilation by the germinating seeds, emerging seedlings, or full grown plants. Thus, the herbicidal compositions of this invention include not only the concentrate compositions comprising the active ingredient and the herbicidal adjuvant but also herbicidal toxicant compositions applied in the field comprising the concentrate composition (i.e., active ingredient plus herbicidal adjuvant) and the carrier.

As demonstrated in the examples above, quite different effects can be obtained by modifying the method of use of the herbicidal composition of this invention. Thus, unusual specificity can be achieved at lower levels of application whereas at higher levels of application a more general herbicidal effect or soil sterilization takes place. Therefore, an essential part of this invention is the formulation of the herbicidal composition so as to permit a uniform predetermined application of the composition to the plant environment to produce the desired effect.

Herbicidal adjuvants useful in preparing the concentrate compositions and, therefore, the herbicidal toxicant compositions applied to the soil or plants, include particulate soil or liquid extending agents such as solvents or diluents within which the active ingredient is dissolved or suspended, wetting or emulsifying agents which serve in providing uniform dispersions or solutions of the active ingredient in the extending agents, and adhesive agents or spreading agents which improve the contact of the active ingredient with the soil or plant surfaces. All herbicidal compositions of this invention include at least one of the above types of herbicidal adjuvants and usually include an extending agent and a wetting or emulsifying agent.

The active ingredient need not be dissolved in the extending agent but may merely be dispersed or suspended in the extending agent as a suspension or emulsion. Also, the organotin compounds may first be dissolved in a suitable organic solvent and the organic solution of the active ingredient then incorporated in water or an aqueous extending agent to form a heterogeneous dispersion. Examples of some suitable organic solvents for use as extending agents include hexane, benzene, toluene, acetone, cyclohexanone, methylethylketone, isopropanol, butanediol, methanol, diacetone alcohol, xylene, dioxane, isopropyl ether, ethylene dichloride, tetrachloroethane, hydrogenated naphthalene, solvent naphtha, petroleum fractions (e.g., those boiling almost entirely under 400° F. at atmospheric pressure and having flash points above about 80° F., particularly kerosene), and the like.

Solid extending agents in the form of particulate solids are very useful in the practice of the present invention. In using this type of extending agent, the active ingredient is either adsorbed or dispersed on or in the finely-divided solid material. Preferably the solid extending agents are not hygroscopic but are materials which render the composition permanently dry and free flowing. Suitable solid extending agents include the natural clays, such as china clays, the bentonites and the attapulgites; other minerals in natural state, such as talc, pyrophyllite, quartz, diatomaceous earth, fuller's earth, chalk, rock phosphate, kaolin, kieselguhr, volcanic ash, salt and sulfur; the chemically modified minerals such as acid-washed bentonite, precipitated calcium phosphate, precipitated calcium carbonate, calcined magnesia, and colloidal silica; and other solid materials such as powdered cork, powdered wood, and powdered pecan or walnut shells. These materials are used in finely-divided form, at least in a size range of 20–40 mesh and preferably in much finer size.

The particulate solid concentrate compositions are applied to the soil by admixture at the time of application with a particulate solid carrier material. If desired, this concentrate composition can also be applied as a wettable powder using a liquid carrier material. When used by this method, a wetting agent or surface active agent is added to the concentrate composition in order to render the particulate solid extending agent wettable by water to obtain a stable aqueous dispersion or suspension suitable for use as a spray. Also, the extending agent applied as a wettable powder is used in very finely-divided form, preferably in a size as small as 100 mesh or smaller.

The surface active agent, that is the wetting, emulsifying, or dispersion agent, used in the herbicidal composition of this invention to serve in providing uniform dispersions of all formulation components of both liquid and dust types in both the concentrate compositions and the toxicant compositions applied, may be either anionic, cationic, or non-ionic types, including mixtures thereof. Suitable surface active agents are the organic surface active agents capable of lowering the surface tension of water and include the conventional soaps, such as the water-soluble salts of long-chain carboxylic acids; the amino soaps, such as the amine salts of long-chain carboxylic acids; the sulfonated animal, vegetable, and mineral oils; quarternary salts of high molecular weight acids; rosin soaps, such as salts of abietic acid; sulfuric acid salts of high molecular weight organic compounds; algin soaps; ethylene oxide condensated with fatty acids, alkyl phenols and mercaptans; and other simple and polymeric compositions having both hydrophilic and hydrophobic functions.

The herbicidal concentrate compositions of this invention ordinarily have the active ingredient and the surface active agent present in higher concentrations than the toxicant compositions applied in the field so that upon dilution with the liquid or solid carrier, compositions containing optimum proportions of active ingredient and surface active agent are prepared to obtain uniform distribution and to maintain the active ingredient in a form which enables the prompt assimilation by the plant.

The liquid concentrate compositions of this invention preferably comprise 5% to 95% by weight of the active ingredient and the remainder the herbicidal adjuvant, which may be solely liquid extending agent or surface active agent (including adhesive agent), but preferably is a combination of liquid extending agent and surface active agent. Preferably, the surface active agent comprises from 0.1% to 15% by weight of the total concentrate composition. The remainder of the composition is the liquid extending agent.

Use of the surface active agent is necessary in the formulation of liquid concentrate compositions in order to obtain a composition containing a sufficient concentration of the difficulty soluble organotin compounds in the liquid extending agent. However, the liquid extending agent must be selected not only on the basis of the amount of the organotin compound dissolved but also upon the basis of the solution temperature of the total composition. Thus, in some formulations, a particular combination of solvents give a sufficiently low solvent temperature but the amount of the organotin compound dissolved or dispersed in the mixture is insufficient and a suitable surface active agent must be selected in order that more organotin compound can be dispersed in the composition. Preferably, the concentrate composition has a solution temperature below 0° C., although compositions having solution temperatures as high as 20° C., can be used.

The concentration of organotin compound in the particulate solid or dust concentrate composition of this invention may vary over wide ranges depending upon the nature of the solid extending agent and the intended use of the composition. Applied at very low rates in order to obtain selectivity, the concentration of the active ingredient in the dust composition may be very low and may comprise as little as 1% or less by weight of the total dust composition. By contrast, when the dust composition is to be used for soil sterilization, it may be desirable to have a very high concentration of active ingredient and for such use the active ingredient may comprise as much as 5% to 98% by weight of the total composition. The remainder of the composition is the herbicidal adjuvant which is usually only the particulate solid extending agent. Thus, the surface active agent is not usually required in dust concentrate compositions although it can be used if desired. However, if the dust concentrate composition is to be applied as a wettable powder, surface active agent must be added to the concentrate composition and ordinarily the amount of surface active agent will be in the range of 0.1% to 15% by weight of the composition.

The carrier material, used for the uniform distribution of the organotin compound in a herbicidally effective amount to inhibit the growth of either all or selected plants, may be either a liquid or a particulate solid material. The liquid and solid extending agents used to prepare the concentrate composition may also be used as the carrier; however, the use of these materials as a carrier is often not economical. Therefore, water is the preferred liquid carrier, both for use with the liquid concentrate composition and the wettable powder concentrate. Suitable particulate solid carriers include the particulate extending agents noted above as well as the solid fertilizers such as ammonium nitrate, urea, and superphosphate, as well as other materials in which plant organisms may take root and grow, such as compost, manure, humus, sand and the like.

The liquid and dust concentrate compositions of this invention can also contain other additaments such as fertilizer and pesticides. Also, these additaments may be used as, or in combination with, the carrier materials.

The herbicidal compositions of this invention are applied to the plant systems in the conventional manner. Thus, the dust and liquid compositions may be applied to the foliage of growing plants by the use of power-dusters, broom and hand sprayers, and spray-dusters. The compositions can also be very suitably applied from airplanes as a dust or a spray because the herbicidal compositions of this invention are effective in very low dosages. In order to prevent growth of germinating seeds or emerging seedlings, the dust and liquid compositions are applied to the soil according to conventional methods, and, preferably, distributed in the soil to a depth of at least ½ inch below the soil surface. It is not absolutely necessary that the herbicidal compositions be admixed with the soil particles and these compositions can be applied merely by spraying or sprinkling onto the surface of the soil. The herbicidal compositions of this invention can also be applied by addition to irrigation water supplied to the field to be treated. This method of application permits the penetration of the compositions into the soil as the water is absorbed therein. Dust compositions sprinkled on the surface of the soil can be distributed below the surface of the soil by the usual discing, dragging, or mixing operations.

The application of a growth-inhibiting amount or toxic amount of the organotin compound to the plant system is essential in the practice of the present invention. The exact dosage to be applied is dependent not only upon the specific organotin compound but also upon the particular plant species to be controlled and the stage of growth thereof as well as the part of the plant to be contacted with the toxicant. In non-selective foliage treatments, the herbicidal compositions of this invention are usually applied at a rate sufficient to obtain from 5 to 50 lbs. of organotin compound per acre but lower or higher rates might be applied in some cases. In non-selective pre-emergent treatments, these herbicidal compositions are usually applied at a somewhat lower rate than in foliage treatments but at a rate which is ordinarily within the same general range; that is, at a rate in the range of 1 to 25 lbs. per acre. In selective pre-emergent applications to the soil, a dosage of from 0.5 to 5 lbs. of active ingredient per acre is usually employed but lower or higher rates may be necessary in some instances. It is believed that one skilled in the art can readily determine from this disclosure, including the examples, the optimum rate to be applied in any particular case.

The essential active ingredient of the herbicidal compositions of this invention is the organotin compound disclosed in this specification. Of course, one skilled in the art will understand that mixtures of various organotin compounds can also be used.

What is claimed is:

1. A process for preparing triorganotin oximes of the general formula $R^1R^2C=N-O-SnR^3R^4R^5$ wherein $R^3$, $R^4$ and $R^5$ are alkyl having not more than 18 carbon atoms, and $R^1$ is selected from the class consisting of alkyl having not more than 6 carbon atoms, phenyl, furyl and hydrogen, $R^2$ is selected from the class consisting of $R^1$ and

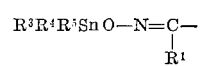

and $R^1$ and $R^2$ when taken together with the carbon atom to which they are attached are

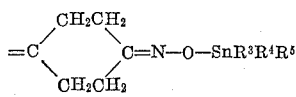

groups, comprising heating to reaction temperature an oxime of the formula $R^1R^2C=N-OH$ wherein $R^1$ and $R^2$ are as defined hereinabove, with a tin compound selected from the class consisting of a triorganotin oxide of the formula $(R^3R^4R^5Sn)_2O$ wherein $R^3$, $R^4$ and $R^5$ are as described hereinabove, and continuously removing the water of reaction.

2. A process of claim 1 wherein the reaction is carried out in the presence of an inert solvent.

3. A process of claim 1 wherein $R^1$, $R^2$, $R^3$, $R^4$ and $R^5$ are alkyl radicals having not more than 6 carbon atoms.

4. A process of claim 1 wherein $R^3$, $R^4$ and $R^5$ are alkyl radicals having not more than 6 carbon atoms and $R^1$ and $R^2$ are phenyl radicals.

5. A process of claim 1 wherein $R^3$, $R^4$ and $R^5$ are alkyl radicals having not more than 6 carbon atoms, $R^1$ is the methyl radical and $R^2$ is an

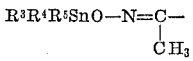

radical wherein $R^3$, $R^4$ and $R^5$ are as defined hereinabove.

6. A process of claim 1 wherein $R^3$, $R^4$ and $R^5$ are alkyl radicals having not more than 6 carbon atoms, $R^1$ is the hydrogen atom and $R^2$ is the alpha-furyl radical.

7. A process of claim 1 wherein $R^1$ and $R^2$ are hydrogen atoms, and $R^3$, $R^4$ and $R^5$ are alkyl radicals having not more than 6 carbon atoms.

8. A triorganotin oxime of the formula $$R^1R^2C=N-O-SnR^3R^4R^5$$

wherein $R^3$, $R^4$ and $R^5$ are alkyl having not more than 18 carbon atoms, and $R^1$ is selected from the class consisting of alkyl having not more than 6 carbon atoms, phenyl, furyl and hydrogen, $R^2$ is selected from the class consisting of $R^1$ and

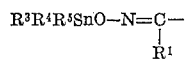

and $R^1$ and $R^2$ when taken together with the carbon atom to which they are attached are

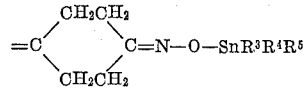

groups.

9. An oxime of claim 8 wherein $R^1$, $R^2$, $R^3$, $R^4$ and $R^5$ are alkyl radicals having not more than 6 carbon atoms.

10. An oxime of claim 8 wherein $R^3$, $R^4$ and $R^5$ are alkyl radicals having not more than 6 carbon atoms and $R^1$ and $R^2$ are phenyl radicals.

11. An oxime of claim 8 wherein $R^3$, $R^4$ and $R^5$ are alkyl radicals having not more than 6 carbon atoms, $R^1$ is the methyl radical and $R^2$ is an

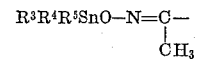

radical wherein $R^3$, $R^4$ and $R^5$ are as defined hereinabove.

12. An oxime of claim 8 wherein $R^3$, $R^4$ and $R^5$ are alkyl radicals having not more than 6 carbon atoms, $R^1$ is the hydrogen atom and $R^2$ is the alpha-furyl radical.

13. An oxime of claim 8 wherein $R^1$ and $R^2$ are hydrogen atoms, and $R^3$, $R^4$ and $R^5$ are alkyl radicals having not more than 6 carbon atoms.

References Cited by the Examiner
UNITED STATES PATENTS

| | | | |
|---|---|---|---|
| 2,988,475 | 6/1961 | Gaertner | 167—30 |
| 2,988,534 | 6/1961 | Eckelmann et al. | 260—429.7 X |
| 2,995,488 | 8/1961 | Jones et al. | 167—30 |
| 2,995,582 | 8/1961 | Garber et al. | 260—347.7 |
| 3,001,860 | 9/1961 | Bimber | 71—2.5 |
| 3,015,551 | 1/1962 | Godfrey et al. | 71—2.5 |
| 3,024,252 | 3/1962 | Engster et al. | 260—347.7 |

ALEX MAZEL, *Primary Examiner.*

IRVING MARCUS, NICHOLAS S. RIZZO, *Examiners.*

H. R. JILES, J. H. TURNIPSEED, *Assistant Examiners.*